United States Patent [19]
Krejza

[11] Patent Number: 4,461,452
[45] Date of Patent: Jul. 24, 1984

[54] VALVE ASSEMBLY FOR A PRESSURE-COOKER

[75] Inventor: Jürgen Krejza, Kuchen, Fed. Rep. of Germany

[73] Assignee: Wurttembergische Metallwarenfabrik, Geislingen, Fed. Rep. of Germany

[21] Appl. No.: 256,681

[22] Filed: Apr. 23, 1981

[30] Foreign Application Priority Data

Apr. 29, 1980 [DE] Fed. Rep. of Germany ....... 3016504

[51] Int. Cl.³ .............................................. F16K 51/00
[52] U.S. Cl. .................................. 251/144; 137/512.3; 137/516.15; 137/516.29; 137/542; 137/556; 137/860; 220/206
[58] Field of Search .................... 137/512.3, 542, 860, 137/516.15, 516.23, 529, 507, 516.29, 843, 852, 556, 557; 251/144; 220/206–208, 303

[56] References Cited

U.S. PATENT DOCUMENTS

| | | | |
|---|---|---|---|
| 1,941,048 | 12/1933 | Punte | 137/843 |
| 2,619,982 | 12/1952 | Turner | 137/557 |
| 3,032,060 | 5/1962 | Huffman | 137/516.15 |
| 3,131,718 | 6/1964 | Mingrone | 137/516.29 |
| 3,320,097 | 5/1967 | Sugalski | 137/860 |
| 3,949,934 | 4/1976 | Goglio | 137/843 |
| 4,162,741 | 7/1979 | Walker et al. | 220/206 |

FOREIGN PATENT DOCUMENTS

| | | |
|---|---|---|
| 7624730 | 3/1977 | Fed. Rep. of Germany . |
| 2606676 | 2/1978 | Fed. Rep. of Germany . |
| 868079 | 5/1961 | United Kingdom ................ 137/843 |

Primary Examiner—A. Michael Chambers
Attorney, Agent, or Firm—Arnold, White & Durkee

[57] ABSTRACT

This invention relates to a valve assembly for a pressure-cooker in accordance with the preamble of claim 1.

4 Claims, 2 Drawing Figures

VALVE ASSEMBLY FOR A PRESSURE-COOKER

DESCRIPTION OF THE PRIOR ART

Such a valve assembly is known from German laying-open print DOS No. 2,606,676. The pressure relief means thereof consists of a check valve which also serves as a safety valve. It has a valve housing of a resilient material which is fitted into a hole in the cover in the vicinity of the cooking valve aperture. The closure body is designed as a shaft-shaped valve body, transverses the valve opening and supports two spaced valve disks inside the cover as well as a dome-shaped head outside the cover. The head abuts against the valve opening in the pressureless state. As the pressure builds up in the pressure-cooker, however, the valve body is lifted and the upper valve disk closes off the valve opening internally so that the pressure in the cooker can build up. When the pressure becomes excessive, the upper valve disk can move outwardly through the valve opening of the valve housing. This allows steam to escape through the valve opening. The second valve disk preventing the valve body from being blown off the cooker although it does not obstruct the escape of steam. The cooking valve usually comprises a spring-loaded valve and a displaceable pressure indicator for the cooker which is located therein and is also spring-loaded. The springs press against the interior of a cap which is adapted to be screwed on to the valve housing. In the known valve assembly, the cap of the cooking valve has an asymmetrical design on the underside facing towards the cooker cover. It features a guide bevel at this location which reduces its clearance height. In the normal cooking position, the area with the maximum inner clearance height overlaps or overlies the check valve. When the cap is screwed off, the area with a minimum clearance height comes to lie above the check valve over which it can move without obstruction when the head of the check valve abuts against the outer side of the valve seat in the completely pressureless state. If the check valve has closed due to the internal build-up of pressure in the cooker, ie if the upper valve disk abuts against the valve seat, the guide bevel presses the valve body of the check valve downwardly and steam can escape through the check valve. The pressure in the cooker is relieved, whilst the person using the cooker is warned simultaneously by the sound of the escaping steam not to unscrew the cap any farther. If the valve body has been raised only slightly owing to a slight superpressure in the cooker, eg at the onset of pressure build-up, an additional stop which projects into the clearance height prevents the cap from being rotated any farther.

The known valve assembly is expensive to manufacture, since it requires a valve housing and a valve body for the pressure relief means. These parts are expensive to manufacture and to assemble. The cap of the cooking valve is also expensive to produce owing to its asymmetrical shape, and the dimensions of the guide bevel as well as the region of reduced clearance height must be kept within a narrow tolerance range: the valve body must be pressed downwardly to open the valve on the one hand, although on the othe hand this must not be so far that the valve head closes the opening externally. Another drawback is that when the cap is rotated into the open position, the stop jams the head of the valve body and this cannot return to its original position, even when the cooker is not under pressure, until the cap has been turned back somewhat. When the check valve functions as a safety valve, the valve disk cannot automatically turn back any longer due to the valve opening. The cap cannot be screwed off over the projecting valve body either. This makes it impossible to gain access to the valve body and return it to the normal position. Yet another disadvantage is that the valve body of the check valve can only be cleaned thoroughly—quite essential for proper sealing—if it has been snapped out of the valve disk. Since this is complicated and troublesome, such cleaning is frequently postponed or forgotten completely.

A valve assembly comprising a pressure relief means disposed adjacent to the cooking valve is also known from German utility model No. 7,624,730. The pressure relief means is designed as a safety valve in the form of a check valve. The cap of the cooking valve has indents on the periphery thereof. Both valves are spatially associated with one another such that the valve body can be raised adjacent to such an indent only when the cap is in certain positions. The check valve can be closed and pressure built up in the cooker only in this position. When the valve body is in the raised position, ie when pressure has built up in the cooker, the valve body in turn locks the cap of the cooking valve which cannot be rotated. Hence, the vent opening cannot be opened by adjusting the cap. This known valve assembly, which therefore does not correspond to the preamble of the present invention, is expensive to manufacture due to the design of the check valve. It is also difficult to clean, since the steam is dissipated to one side through a cavity in the cooking valve beneath the cap when the safety valve responds to excessive pressure. These cavities are difficult to reach, even after the cap has been removed. Furthermore, the valve body cannot be turned back into its original position until after the safety valve has responded and the excess pressure has been vented off. Only then can the cap be removed from the cooking valve.

SUMMARY OF THE INVENTION

The object of the present invention is to provide a valve assembly according to the preamble of the claim which is economical to manufacture, easy to clean and simple to operate in all modes of operation.

The object is accomplished in accordance with the invention by the feature of the main claim.

The construction of the closure body as a seal disposed on the cap makes it possible to design the vent opening in the form of a simple hole in the cover without any valve housing. Such a hole can be produced during one and the same operation as the hole for the cooking valve. It is easy to clean. The arrangement of the associated seal in the cap gives rise to a constructional design which is simple and easy to clean. This construction of the pressure relief means is made possible by the recognition that the vent opening need only be open to relieve the pressure. An open valve is unnecessary prior to a pressure build-up, since the air being heated up can escape by way of the conventional sealing rings between the pressure-cooker and the cover until the sealing ring abuts sealingly against the cover and cooker wall due to the build-up of pressure. In the pressure relief means in accordance with the invention, the co-operation of the seal and the vent opening permits steam to escape even when the cap is moved minimally towards the venting position. The pressure in the cooker decreases immediately. Moreover, the co-action of the venting opening and the seal generates a warning sound which warns the cook not to opening the cooking valve while the cooker is still under pressure. If there is no seal in the cap, no pressure will build up in the cooker at all.

The seal can advantageously consist of a material which is so resilient that it sealingly closes the vent opening at normal cooking pressure and permits pressure to be vented should it become eccessive. The pressure relief means thus functions as a safety valve as well.

In a preferred embodiment, the seal is designed in an annular shape. It is impossible to insert a ring improperly. The opening is always covered irrespectively of the angular position of the cap in the cooking position.

The annular seal advantageously has an internal diameter which is smaller than the external diameter of the cap section it surrounds. The annular seal is thus seated in the cap region in such a way that it can be neither twisted nor lost. Dirt cannot readily collect between the cap and the annular seal so that the seal does not have to be removed every time the cooker is cleaned.

BRIEF DESCRIPTION OF THE DRAWING

One embodiment of the invention will now be described in the following with reference to the drawings, in which.

DESCRIPTION OF THE PREFERRED EMBODIMENT

Figure 1:
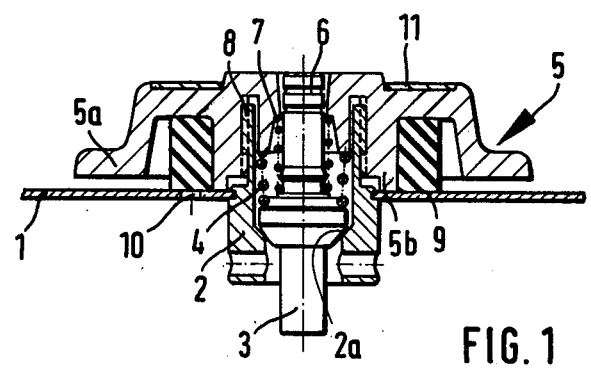
FIG. 1 is a cross-sectional elevation of the valve assembly in accordance with the invention and FIG. 2 is a top elevation.

FIG. 1 indicates the cover 1 of a pressure-cooker. A valve housing 2 is firmly riveted into place in the cover 1. It includes a valve seat 2a against which a valve body 3 is urged by a valve spring 4. This valve spring 4 presses against the inner side of a cap 5 overlying the entire valve assembly and designed as a cap or acorn nut. A pressure indicator 6 is displaceably mounted in the valve body 3. It is pre-biased by a pressure indicator spring 7 which presses against the valve body on the one hand and, on the other hand, against the inside of the cap 5. The cap 5 is adapted to be screwed on to the valve housing by means of a thread 8, thereby determining the tension of the valve and pressure indicator springs.

The cylindrical inner part 5b of the cap 5 forming the nut is surrounded by an annular seal 9 of a resilient material. The annular seal has an internal diameter which pre-biases it on the nut. The brim 5a of the cap extends externally to the annular seal.

The cover 1 has a hole 10 in spaced relation from the valve axis and is located between the internal and external diameters of the annular seal. It serves as a vent opening and is closed by the annular seal 9 during cooking.

Figure 2:
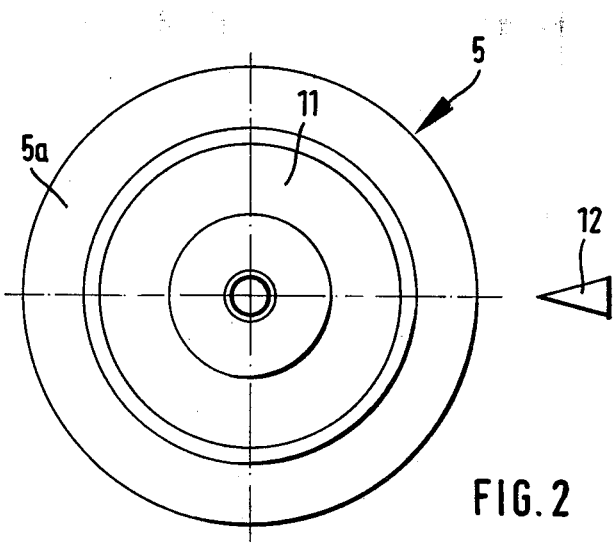

FIG. 2 shows the cap 5 from the top. It features a inscribed ring 11 which indicates the setting of the cap relative to an arrow 12 on the cover (not shown).

The afore-described valve assembly functions as follows during cooking: the cap 5 is screwed down to the stop with the inscription "cooking" adjacent to the arrow 12. The valve spring as well as the pressure indicator spring are both pre-biased in this position. The annular seal 9 closes the hole 10. Steam pressure can now build up in the cooker in the known manner once the warm air has escaped between the cooker and the cover as mentioned above. The cooking pressure is chosen by regulating the supply of heat in response to the position of the pressure indicator 6. At the conclusion of cooking, the cap 5 is turned half a turn to the "venting" position. This causes the annular seal to release the hole 10, the steam can escape and the pressure is relieved. The venting is continuous and dependent on the speed of rotation.

If the pressure indicator is not observed during cooking, i.e. if the supply of heat is not turned down at the proper time, thus causing the pressure in the cooker to become excessive, the steam can escape through the hole 10. This gives off a warning whistle and deforms the annular seal 9. Should the generated steam still be excessively high, the valve body 3 is lifted off its seat 2a.

I claim:

1. A valve assembly for a pressure cooker comprising a cooking valve mounted on a pressure cooker cover, a vent opening in the cover, an adjustable cap which is located on the cooking valve and is manually adjustable during use towards and away from the cover, and a closure body which is secured to the cap between the cap and the cover to cooperate with the vent opening, the closure body being in the form of a seal of resilient material which can be compressed by manual adjustment of the cap to a cooking position to close the vent opening, and which can deform when pressure builds up during use to allow automatic release of excess pressure through the vent opening, and the cap being manually adjustable to lift the seal and thus open the vent opening for pressure relief.

2. A valve assembly according to claim 1, in which the seal is in the form of an annular seal.

3. A valve assembly according to claim 2, in which the annular seal has an internal diameter which is smaller than the external diameter of a cap section which it surrounds to frictionally hold the seal on the cap section.

4. A valve assembly according to claim 1, in which the adjustable cap is in the form of a cap nut.

* * * * *